United States Patent
Sammon et al.

(10) Patent No.: US 6,563,914 B2
(45) Date of Patent: May 13, 2003

(54) PERSONAL WEB-BASED TELECONFERENCING METHOD AND SYSTEM

(75) Inventors: Michael J. Sammon, Watchung, NJ (US); Wai Nam Tam, Flanders, NJ (US); Warren Gifford, Holmdel, NJ (US); David Turock, Upper Montclair, NJ (US)

(73) Assignee: Call Sciences Limited, Slough (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,986

(22) Filed: Feb. 26, 1997

(65) Prior Publication Data

US 2001/0016038 A1 Aug. 23, 2001

(51) Int. Cl.[7] .......................... H04M 1/64; H04M 11/00; H04M 3/42
(52) U.S. Cl. .............................. 379/202.01; 379/88.13; 379/88.17; 379/93.21; 379/100.15; 379/158; 379/205.01; 379/207.01
(58) Field of Search .................................. 379/201, 202, 379/203, 204, 205, 206, 131, 142, 245, 265, 67.1, 88.17, 88.18, 88.13, 93.09, 93.21, 100.15, 158, 202.01, 205.01, 207.01; 707/10, 104; 345/330, 332

(56) References Cited

U.S. PATENT DOCUMENTS

| | | | |
|---|---|---|---|
| 4,540,850 A | 9/1985 | Herr et al. | 379/88.19 |
| 4,544,804 A | 10/1985 | Herr et al. | 379/204 |
| 4,550,224 A | 10/1985 | Winchell | 379/202 |
| 4,577,065 A | 3/1986 | Frey et al. | 379/204 |
| 4,635,251 A | 1/1987 | Stanley et al. | 370/62 |
| 4,653,090 A * | 3/1987 | Hayden | 379/204 |
| 4,658,416 A | 4/1987 | Tanaka | 455/417 |
| 4,691,347 A | 9/1987 | Stanley et al. | 379/203 |
| 4,796,293 A | 1/1989 | Blinken et al. | 379/202 |
| 4,797,877 A | 1/1989 | Pope et al. | 370/62 |
| 4,809,262 A | 2/1989 | Klose et al. | 370/62 |
| 4,937,856 A | 6/1990 | Natarajan | 379/158 |
| 5,113,431 A | 5/1992 | Horn | 379/93.14 |
| 5,244,094 A | 9/1993 | Graff, Jr. et al. | 206/564 |
| 5,251,248 A | 10/1993 | Tokunaga et al. | 455/461 |
| 5,274,700 A | 12/1993 | Gechter et al. | 379/210 |
| 5,329,578 A | 7/1994 | Brennan et al. | 379/67.1 |
| 5,363,425 A | 11/1994 | Mufti et al. | 379/38 |
| 5,375,068 A | 12/1994 | Palmer et al. | 364/514 |
| 5,392,342 A | 2/1995 | Rosenthal | 379/211 |
| 5,408,518 A | 4/1995 | Yunoki | 379/67.1 |
| 5,408,526 A | 4/1995 | McFarland et al. | 379/202 |
| 5,408,528 A | 4/1995 | Carlson et al. | 379/211 |
| 5,422,883 A | 6/1995 | Hauris et al. | 370/62 |
| 5,475,747 A | 12/1995 | Bales et al. | 379/201 |
| 5,483,587 A | 1/1996 | Hogan et al. | 379/202 |
| 5,495,522 A | 2/1996 | Allen et al. | 379/202 |
| 5,517,560 A | 5/1996 | Greenspan | 379/114 |
| 5,524,110 A | 6/1996 | Danneels et al. | 370/62 |
| 5,533,110 A | 7/1996 | Pinard et al. | 379/201 |
| 5,544,237 A | 8/1996 | Bales et al. | 379/205 |

(List continued on next page.)

Primary Examiner—Allan Hoosain
(74) Attorney, Agent, or Firm—Oblon, Spivak, McClelland, Maier & Neustadt, P.C.

(57) ABSTRACT

A method and system which utilize a graphical user interface to identify potential participants in a teleconference, specify a user-controlled dial-up/hang-up order, and monitor the status of participants to the teleconference. The method and system receive conference commands from a World Wide Web (WWW) browser and translate the conference commands into commands that control a telephone bridge.

24 Claims, 5 Drawing Sheets

U.S. PATENT DOCUMENTS

| | | | |
|---|---|---|---|
| 5,559,876 A | 9/1996 | Alperovich | 379/205 |
| 5,572,582 A | 11/1996 | Riddle | 379/202 |
| 5,636,209 A * | 6/1997 | Perlman | 370/281 |
| 5,652,789 A * | 7/1997 | Miner et al. | 379/201 |
| 5,745,711 A * | 4/1998 | Kitahara et al. | 345/330 |
| 5,754,636 A * | 5/1998 | Bayless et al. | 379/142 |
| 5,857,189 A * | 1/1999 | Riddle | 707/10 |
| 5,867,494 A * | 2/1999 | Krishnaswamy et al. | 370/352 |
| 5,884,039 A * | 3/1999 | Ludwig et al. | 395/200.57 |
| 5,896,128 A * | 4/1999 | Boyer | 345/327 |
| 5,903,637 A * | 5/1999 | Hogan et al. | 379/203 |
| 5,916,302 A * | 6/1999 | Dunn et al. | 709/204 |
| 5,936,662 A * | 8/1999 | Kim et al. | 348/15 |

* cited by examiner

FIG. 1

Teleconference Setup

|     | Name    | Phone Number | Rate       |
|-----|---------|--------------|------------|
| Me  | Me      | 9085551234   | $0.00/min  |
| 2   | Person2 | 9085552345   | $0.00/min  |
| 3   | Person3 | 9085553456   | $0.00/min  |
| 4   |         |              | $0.00/min  |
| 5   |         |              | $0.00/min  |
| 6   |         |              | $0.00/min  |

[Help]  [Begin Conference]  [Demo]

*FIG. 2*

Credit Card Information o Amex    o Visa    o MasterCard    o Discover

Card No: [          ]

Expiration: [  ] Month  [  ] Year

Location: [USA ▼] Where was credit card obtained?

ZipCode: [     ] US Credit Cards Only

Email: [                    ]

[Submit]

[Clear Entries]

*FIG. 3*

Teleconference Conttrol 19085551234    19085552345    19085553456
Me             Person2        Person3

[Help]  [Change Participants]  [End Conference]

*FIG. 4*

What the phone icons mean

FIG. 5

Time and Charges for Your Conference Call

| Phone Number | Duration (min) | Charge (US Dollars) |
|---|---|---|
| 19085551234 | 5 | $1.50 |
| 19085552345 | 1 | $0.30 |
| | Subtotal($5.00 min) | $5.00 |
| | Taxes | $0.00 |
| | Total | $5.00 |
| | Charge to Your Account | $5.00 |

FIG. 6

TPS Call Sciences regrets that you had trouble using our Personal Teleconferencing system In order for us to credit your account, please indicate the type of trouble you experienced by checking the appropriate boxes next to each phone call. When finished, click the Submit button

| Phone Number | Noise on the line | Disconnected | Other |
|---|---|---|---|
| 19085551234 | ☐ | ☐ | ☐ Type trouble here |
| 19085552345 | ☐ | ☐ | ☐ Type trouble here |

PERSONAL WEB-BASED TELECONFERENCING METHOD AND SYSTEM

BACKGROUND OF THE INVENTION

1. Field of the Invention

The present invention relates to a method and system for establishing teleconferences. More specifically, the present invention relates to a new and improved method of establishing dial-out, multi-party teleconferences without the need for human operator support or reservations made in advance.

2. Description of the Background

Known teleconference systems are generally classified into one of two types of systems: 1) dial-in conferences and 2) dial-out or dial-up conferences; however, both types of systems are used for establishing teleconferences, i.e., telephone communications between two or more parties. Stanley et al., U.S. Pat. No. 4,635,251; and Frey et al., U.S. Pat. No. 4,577,065; disclose dial-in conference systems. Before a dial-in conference is established, a reservation is made in advance with an operator (or automated equivalent), typically a few days before the teleconference. The reservation made in advance includes the time at which the teleconference will begin and the names or phone numbers of the parties that have been invited to participate. The operator reserves for the specified time a portion of a specialized telephone switch, called a bridge, which will join or "bridge" calls from each participating caller with each of the other callers. Examples of known bridges are 1) the LNX 2000 by Excel and 2) the SDS-500 by Summa Four Inc. At the reserved time, callers dial into a centralized telephone number, typically an 800-number, and are added to the conference, based on their calling telephone number, the participants name, a conference identification or other suitable identifying means. The system, however, has the disadvantages of: 1) using reservations made in advance which prevent spontaneous teleconferences, and 2) not always indicating who is present on the teleconference at any given time.

Known dial-out or dial-up conference systems, such as those disclosed in Yunoki, U.S. Pat. No. 5,408,518; and Hogan et al., U.S. Pat. No. 5,483,587; use reservations made in advance and operate similarly to the dial-in conference. However, in dial-out conferences the bridge uses the information in the reservation made in advance to call the participants individually. As each new participant accepts the invitation to join, the bridge connects the new participant with any other participants, thereby forming the teleconference. Disadvantages of this type of dial-out system are that: 1) the conference initiator does not have control of the order of dialing or the removal of unwanted parties, and 2) a reservation has to be made in advance to use the system.

SUMMARY OF THE INVENTION

The present invention addresses the deficiencies of known systems 1) which do not provide user-controlled dialing, 2) which do not display the status of participants, 3) which require reservations to be made in advance, and 4) which require operator intervention to establish a teleconference. The present invention utilizes a graphical user interface to identify potential participants in a teleconference, specify a user-controlled dial-up/hang-up order, and monitor the status of participants to the teleconference. The method and system receive conference commands from a World Wide Web (WWW) browser and translate the conference commands into commands that control a telephone bridge. The best presently known mode of implementing the present invention is with a specially programmed general purpose microprocessor programmed using microprocessor-specific executable instructions and which communicates with a telephone bridge. The instructions are generated by compiling a high-level computer language program, assembling a low-level computer program, and linking the two to produce an executable program. The executable program implements the method and system, and the executable instructions are written into a computer memory readable by the general purpose microprocessor.

BRIEF DESCRIPTION OF THE DRAWINGS

These and other aspects of the present invention will become clear to those skilled in the art in view of the description of the best presently known mode of carrying out the invention and the industrial applicability of the preferred embodiment as described herein and as illustrated in the several figures of the drawings.

DETAILED DESCRIPTION OF THE PREFERRED EMBODIMENTS

Figure 1:
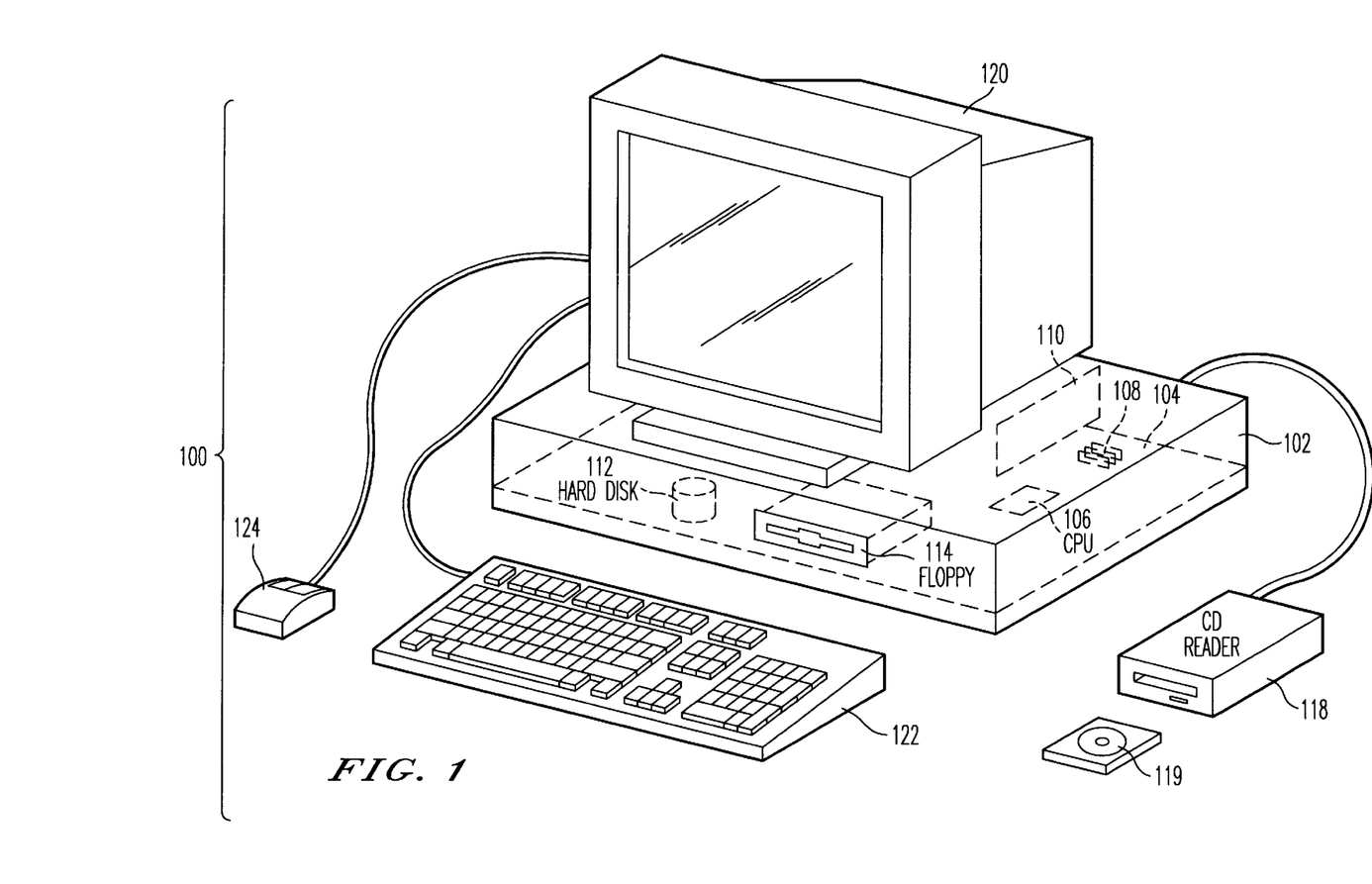
FIG. 1 is a schematic illustration of a general purpose computer for controlling a telephone bridge according to the present invention.

Referring now to the drawings, wherein like reference numerals designate identical or corresponding parts throughout the several views, FIG. 1 is a schematic illustration of a computer system for controlling teleconferences according to the present invention. A computer 100 implements the method of the present invention, wherein the computer housing 102 houses a motherboard 104 which contains a CPU 106 and memory 108. The computer 100 also includes plural input devices, e.g., a keyboard 122 and mouse 124, and a display card 110 for controlling monitor 120. In addition, the computer system 100 further includes a floppy disk drive 114 and other removable media devices (e.g., compact disc 119, tape, and removable magneto-optical media (not shown)), a hard disk 112, or other fixed, high density media drives, connected using an appropriate device bus, e.g., a SCSI bus or an Enhanced IDE bus. Although compact disc 119 is shown in a CD caddy, the compact disc 119 can be inserted directly into CD-ROM players which do not require caddies. Also connected to the same device bus or another device bus, the computer 100 may additionally include a compact disc reader/writer 118 or a compact disc jukebox (not shown). To receive control requests from participants, to send status information and to establish communications with other computers, the computer 100 is equipped with a communications adapter (not shown) which connects directly or indirectly to the Internet, an Intranet or a Local/Wide Area Network. The communications adapter may be any one of the wired or wireless communication devices that can be attached to a computer, including, but not limited to, a modem (telephone- or cable-based), an infra-red transceiver, an Ethernet card, a Token-ring card, an ATM adapter, an Asymmetric Digital Subscriber Line, a "Fire-wire", or a universal serial bus. In addition, the present invention can be implemented by a set-top box which provides WWW services (e.g., WebTV). In addition, a printer (not shown) also provides printed lists of teleconference information.

The system further comprises at least one computer readable media. Examples of such computer readable media are compact discs, hard disks, floppy disks, tape, magneto-optical disks, PROMS (EPROMS, EEPROMs, Flash PROMs), DRAM, SRAM, etc. Stored on any one or on a combination of the computer readable media, the present invention includes software for controlling both the hardware of the computer 100 and for enabling the computer 100 to interact with a human user. Such software may include, but is not limited to, device drivers, operating systems and user applications, such as software development tools. Such computer readable media further includes the computer program product of the present invention for real-time control of teleconferences via requests received from users at remote sites.

To provide the teleconference service, the present invention utilizes a WWW server which "listens" for connection requests on a specified TCP/IP ports (e.g., port 80 for HTTP and port 443 for HTTPS). When a user wishes to establish a teleconference with other potential participants, the user connects to the WWW server using a conventional WWW browser, such as Netscape Navigator by Netscape Communications or Internet Explorer by Microsoft Corporation, and specifies the URL which identifies the request as a teleconference initiation request. An exemplary URL (Universal Resource Locator) which would identify the request as a teleconference initiation request is:

http://www.tpsinc.com/ptc where "http" specifies that the request should be made using the HyperText Transfer Protocol, "www.tpsinc.com" indicates the name of the machine on which the WWW server resides, and "/ptc" indicates the local resource on the WWW server to be retrieved. It is preferable that the WWW browser support "forms" as defined by the HTML 2.0 standard and by the proposals for HTML 2.0+ and HTML 3.0. This allows information to be gathered more compactly than can be gathered with a WWW browser that does not support forms. In addition, the preferred embodiment generates "cookies" at the WWW server when a conference is requested and utilizes the "cookies" as part of the communication between the WWW browser and WWW server. Other methods of saving state can also be used depending on the capabilities of the WWW browser that the user is using. Hidden fields in forms can be used to identify a teleconference, or additional parameters can be used to create an augmented URL which identifies the conference. The use of "cookies" will be explained in more detail below.

Figure 2:
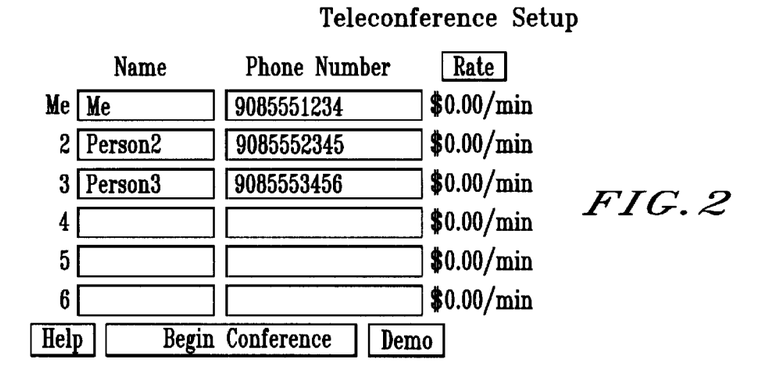
FIG. 2 is a partial illustration of an exemplary computer form which is filled out during conference registration.

After the WWW browser connects to the WWW server, the WWW browser is sent a series of text and HyperText Markup Language (HTML) commands from the WWW server. The WWW browser interprets the HTML commands and renders the text as a screen or a form. One such form is shown in FIG. 2. FIG. 2 illustrates that multiple names and phone numbers can be entered into the form to identify the potential participants of the teleconference. This information and the remaining information and Web pages are transmitted between the WWW server and the WWW browser securely to ensure that others cannot detect credit card numbers or information about the phone calls. Although the screen is shown as having slots for six participants, more or fewer entries can be provided depending upon the capabilities of the bridge or constraints established by the service provider. For users unfamiliar with the operation of the teleconference system, help can be obtained by clicking on the "Help" button on the form, or a demonstration can be displayed by clicking on the "Demo" button. Help and demonstration files can then be provided to the user in the form of HTML documents, audio prompts or even MPEG videos. In addition to dynamic demonstrations, static tutorial text and images can be sent to the browser for display. Also, after numbers (and potentially names) have been entered into the form, a user can select the "Rate" button to determine the cost per minute of the teleconference on a participant-by-participant basis. This allows a user to estimate the cost of a teleconference before it is started. When the numbers of the participants have been entered and the user is ready to initiate a teleconference, the user selects the "Begin Conference" button and the information in the form is submitted to the WWW server.

Figure 3:
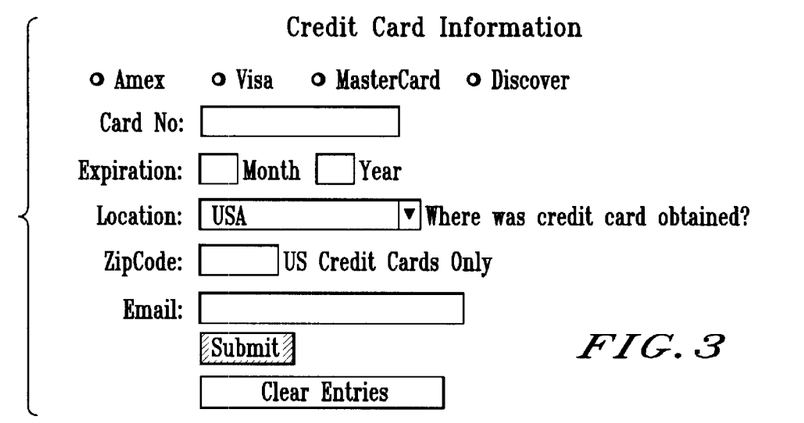
FIG. 3 is a partial illustration of an exemplary computer form which is filled out during conference registration to provide billing information for a teleconference.

The WWW server responds by sending to the user a second form, such as the one shown in FIG. 3. The second form is filled in by the user to specify a method of payment for the teleconference. Since credit cards are the most convenient and universally used method of electronic payment, the preferred embodiment uses credit card information to authorize the teleconference. Other embodiments include other methods of electronic payment such as electronic cash transfers with a PIN or electronic payments such as those available by systems produced by CyberCash. After the card, or other payment information, has been entered, the user selects the "Submit" button to send to the information to the WWW server for authorization. If there are any incorrect values in the information or there are any holds on the credit card, the teleconference will not be initiated and the user is asked to re-enter the information or choose another method of payment.

Figure 4:
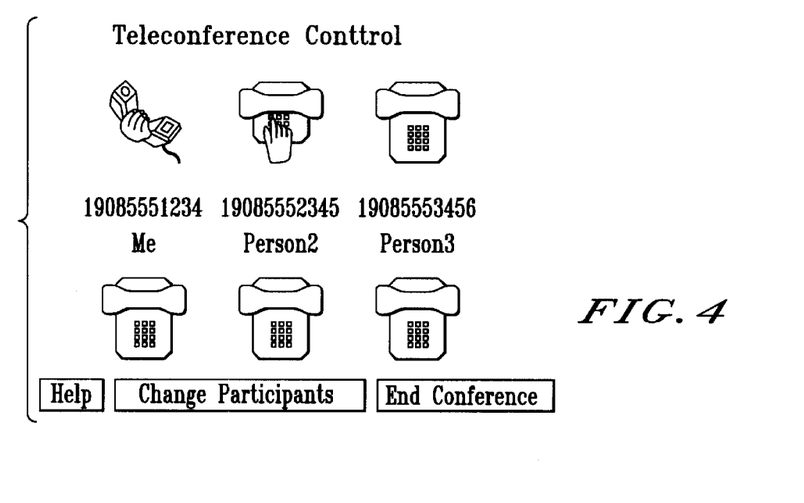
FIG. 4 is a partial illustration of an exemplary computer screen which acts as a control interface for controlling the operation of a teleconference.
Figure 5:
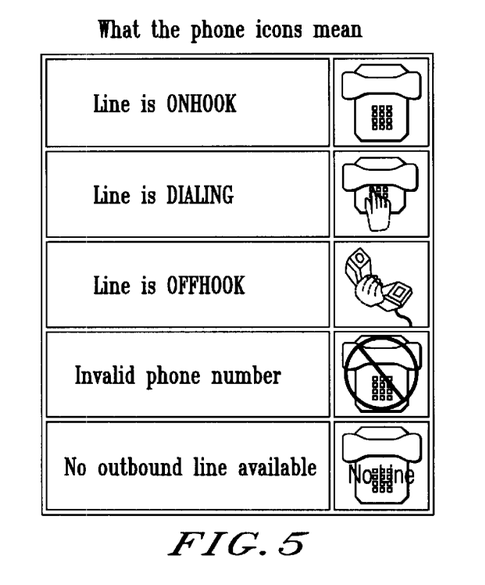
FIG. 5 is an illustration of exemplary computer icons which indicate the status of teleconference participants.

If the payment method is authorized, the WWW server pre-authorizes a minimum charge and sends the browser the control interface, such as the one shown in FIG. 4. Initially all the telephone icons are shown as displayed, using the icon which indicates the "on-hook" status. FIG. 5 illustrates that for this interface, the on-hook icon is a telephone with the telephone handset resting in the cradle. Typically a user will begin by connecting himself/herself to the teleconference first. To do this, the user clicks or otherwise selects the icon with the user's phone number. In FIG. 4, the user has selected the icon labeled "Me" and the bridge has called the user. However, this requires that the user not be using his phone line already to control the WWW browser. If the user has a dial-up connection, a second phone line will have to be used to receive the phone call.

Periodically the WWW browser sends status requests to the WWW server to "refresh" its status information and determine if any of the participants have changed their statuses since the last check. This periodic refresh is performed by including in the HTML document the "meta" command to refresh the data, along with a refresh interval. However, the WWW browser only performs the refresh while the user is displaying the HTML page or document with the refresh tag. If the user selects another URL, the user loses the ability to track status information. Using a periodic check of the status, as shown in FIG. 4, the user is shown that not only has the user selected the number corresponding to the user, the user has answered the phone as indicated by the "off-hook" telephone icon.

After having completed the first connection from the bridge to the user, the bridge will play an announcement (if possible) to the user indicating that the user is being invited to participate in a teleconference. If the user wishes to participate, the user remains on the line. Some bridges are not capable of playing voice announcements to participants as they join. If the bridge is not capable of playing a voice announcement to the user, the user will simply hear silence until the next participant is added.

When the user is ready to contact the next participant, the user selects the icon corresponding to the next participant to be contacted. By selecting the icon, a request to dial the next participant is sent from the WWW browser to the WWW server. In FIG. 4, the user has selected "Person2" as the next participant to be added, and the user's request is acknowledged by providing a response to the HTML request which includes an indication that the icon of "Person2" should be displayed as a hand dialing the phone. When "Person2" answers the phone, the bridge connects "Person2" with any other participants—in this case the user. The next time the WWW browser refreshes its status information, the user will be sent information indicating that "Person2" has gone off-hook, and the display will be updated so that "Person2" also has the off-hook icon.

Additional participants that were set-up during the call initiation phase and that have icons can be called in a manner similar to the manner shown above for calling "Person2". In addition, if the user wishes to disconnect a participant from the conference call, the user can select an off-hook icon to send the WWW server a hang-up request. The WWW server will send the bridge a command to remove the selected participant from the conference. Communication between the WWW server and the bridge is discussed in more detail below. Also, it is possible that at the end of a conference the user wishes to disconnect all participants simultaneously. To do so, the user selects the "End Conference" button and the WWW server receives the request which is translated into a bridge command to stop the teleconference.

It is also possible that during the teleconference the user determines that a number entered for a participant is incorrect. If the user selects an invalid number, the WWW server will respond by sending status information and an icon to the user to indicate that the phone number is invalid. An example icon indicating an invalid phone number is shown in FIG. 5. Another possible error condition that can occur is that there are no additional outbound lines with which the bridge can call participants. If this happens when a user has selected a number to be dialed, the WWW server sends the status information and the icon for this condition back to the WWW browser. An exemplary icon for this condition also is shown in FIG. 5.

Even with correct numbers entered for the participants, it is also possible that the teleconference as initially configured will not meet the user's needs. If the user wants to add a new participant that he/she had not originally thought of, the user selects the "Change Participants" button. In response, the WWW server will send back (and the WWW browser will re-display) the Teleconference Setup screen complete with all the existing numbers, but the "Begin Conference" button is replaced with a "Return to Conference" button. The user can then change any of the information for participants that are on-hook. The additions/changes are submitted to the WWW server by selecting the "Return to Conference" button, and the Teleconference Control screen is redisplayed based on the new information.

Figure 6:
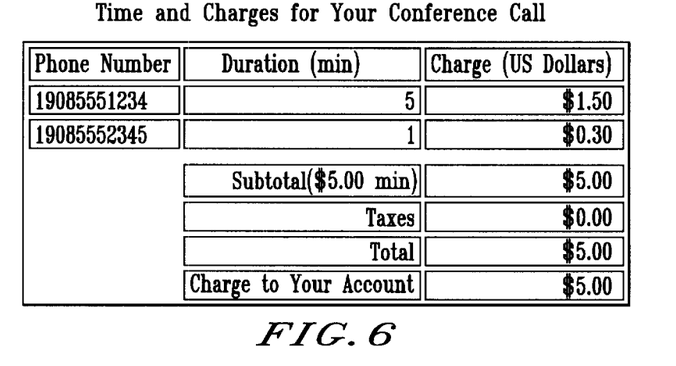
FIG. 6 is a partial illustration of an exemplary computer form which details the charges incurred during a teleconference which requires a $5.00 minimum charge.

When a teleconference is complete, either when all the participants have hung up or after the user selects the "End Conference" button, the user is provided a summary of the charges that have been incurred. An exemplary form showing the charges broken down by participant is shown in FIG. 6. In FIG. 6, the system is assumed to have a $5.00 minimum charge, so the $1.30 total cost is actually rounded up to $5.00.

Figure 7:
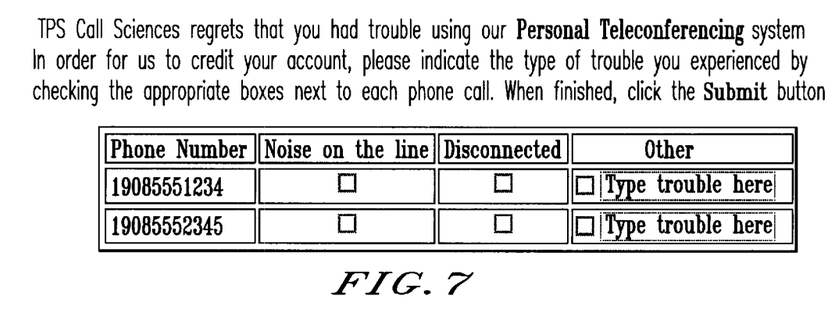
FIG. 7 is a partial illustration of an exemplary computer form which allows problems with the teleconference to be reported during a post-teleconference "wrap-up"

During the post-teleconference wrap-up, it is also possible to report problems with the teleconference. FIG. 7 shows an exemplary form for reporting problems back to the WWW server and receiving automatic credits. Two problems that are displayed on the form are: 1) Noise on the line, and 2) Disconnected. The user may indicate that either or both of the conditions occurred by selecting their corresponding check-boxes. If either of the conditions occur, the user is given a credit to allow the user to reconnect without paying for the lost time. To avoid fraud, credits are not provided for more than one minute per leg of any particular call. Calls that continue longer than one minute clearly have provided value to the user. If the line had been truly unusable, the user could have just selected hang-up and restarted.

While a conference is proceeding, it is possible to exceed the pre-authorized amount originally authorized by the WWW server when the teleconference was established. Four alternate embodiments of the present invention provide alternate responses to what happens when the pre-authorized limit is exceeded. In the first embodiment, the teleconference is simply cut-off when the pre-authorized limit has been exceeded. In the second embodiment, the WWW browser is updated to request that the user pre-authorize an amount equal to the original pre-authorized amount. If this authorization is not given, then the teleconference is ended. However, the user may not be looking at the WWW browser at the time the call needs to be re-authorized, or the user may have directed his/her WWW browser to look at something other than the status information. In either case, the user would miss the opportunity to re-authorize. Therefore, in the third embodiment, an announcement is played via the bridge requesting that the user pre-authorize an amount equal to the original pre-authorized amount. In the third embodiment, the user can confirm using DTMF tones. In the fourth and preferred embodiment, the user is simply informed as part of the initialization process that any additional charges will be automatically charged to his/her account, then the user's payment method is re-authorized each time the user exceeds the existing pre-authorized amount. If the pre-authorization ever fails, the conference is terminated at the end of the pre-authorized amount.

To avoid having to re-authorize frequently, the present invention pre-authorizes the payment method according to a statistical model of average conference length and cost per minute for each participant. A typical pre-authorized amount for small conferences is $25, but for international or large conferences, several hundred dollars may be pre-authorized. Also, the pre-authorized amount may be changed if the number of participants changes during the teleconference, especially if an international number is added. The conference monitor 340 which tracks whether a conference soon will exceed its pre-authorized amount is discussed in greater detail with reference to FIG. 9.

In an alternate embodiment, the WWW server also sends a running total of the teleconference back to the user with each status "refresh" request. This allows a user to better track the actual cost of a conference, especially with more costly international calls.

Figure 8:
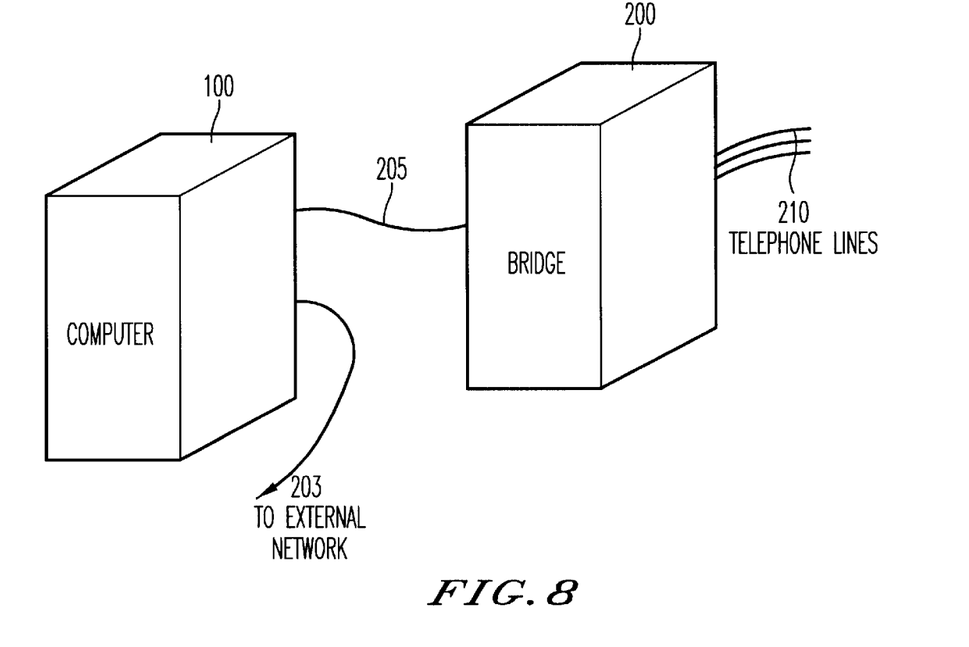
FIG. 8 is a schematic illustration of a general purpose computer system connected to a telephone bridge for controlling teleconferences.

To implement the present invention, as shown in FIG. 8, the computer 100 is connected using communications path 203 via the communications adapter to an external network, preferably the Internet, but additional networks such as a satellite data network or bulletin board service are also possible. Communications channel 205 connects the computer 100 and the bridge 200 to allow the computer 100 to send commands to the bridge 200 and to receive status requests from the bridge 200. The communication channel 205 can be either wired (e.g., Token ring, Ethernet, ATM) or wireless (e.g., infra-red). Also, the bridge 200 is connected via telephone lines 210 to the telephone network to connect to the teleconference participants. In an alternate embodiment, the telephone lines 210 are replaced by other known communication media, either wired or wireless.

Figure 9:
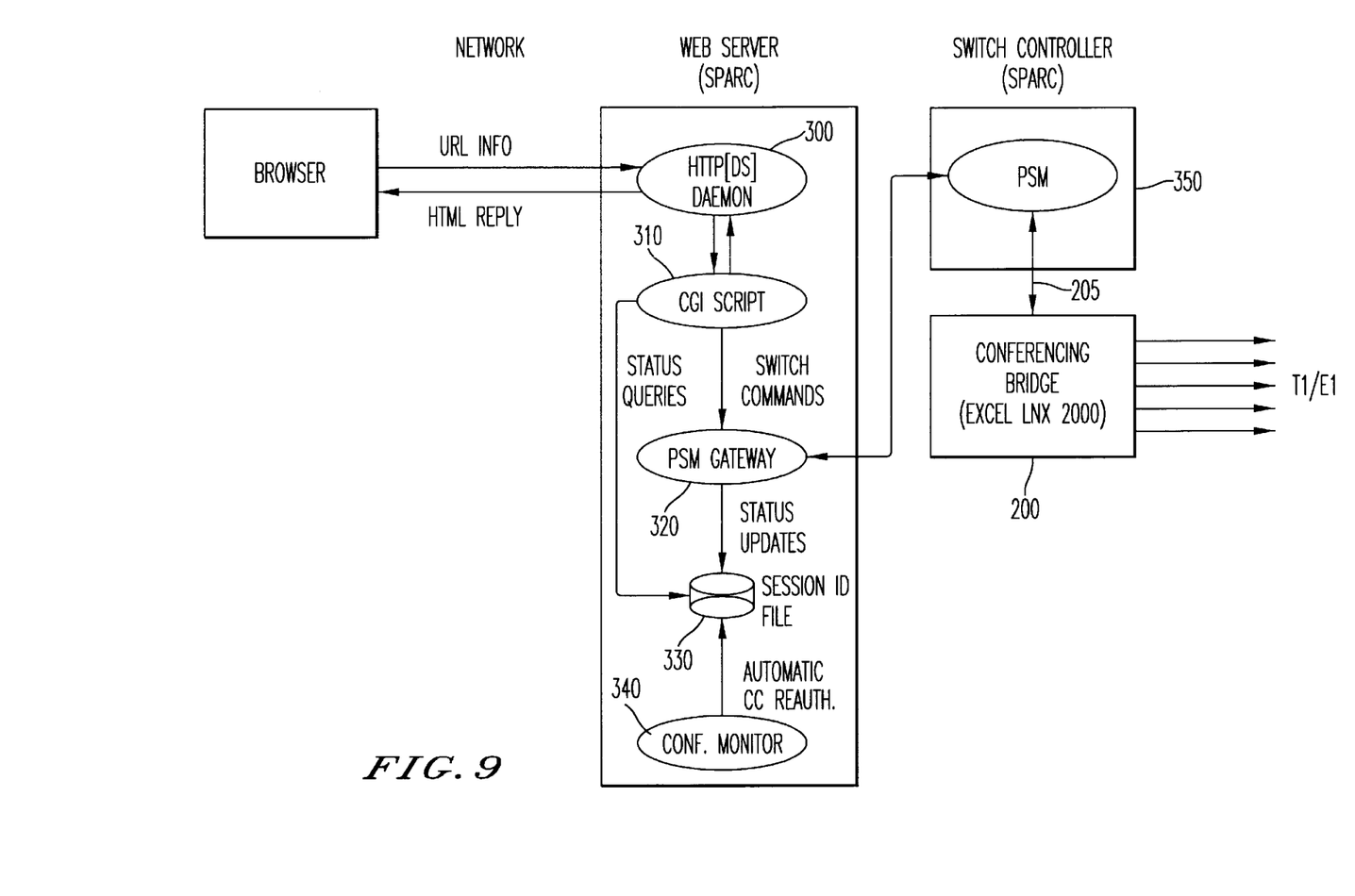
FIG. 9 is a schematic illustration of components used to receive requests from the WWW browser, process the requests, send commands to the bridge and receive status responses from the bridge.

As shown in FIG. 9, when a request is received from a browser via a network (e.g., the Internet), the request is received by a WWW server 300 (e.g., an HTTP Daemon or an HTTPS (secure HTTP) Daemon) running on the computer system 100. If the request is for a static document, the WWW server 300 provides the document to the browser as part of an HTML reply without having to contact any other processes. If the request requires control of the switch or status information, the WWW server spawns a CGI program 310 to handle the request. As would be appreciated by one of ordinary skill in the art, the CGI program 310 can be either a compiled program or an interpreted script. Presently the best known mode uses Perl scripts to implement the CGI programs 310 spawned by the WWW server 300. One advantage of Perl scripts is the ability to use TCP/IP sockets to communicate with other processes, such as the Programmable Switch Matrix (PSM) Gateway 320. As shown in FIG. 9, in one embodiment of the present invention, depending on the type of request, the CGI program either requests status information from a storage device 330 or issues a command to the PSM Gateway 320. Status information requested from the storage device 330 includes both information received from the bridge 200 (e.g., information such as the status of the connection of each participant), and information available from other sources (e.g., whether or not a payment method was authorized, participant name and telephone information, total cost of a teleconference). When returning status information, the CGI program reads the status information and formats the requested status information as HTML. The CGI program returns the HTML reply to the WWW server 300 which passes the HTML reply to the user via the external network. In systems which allow the WWW server 300 to pass the open socket to a child process and to close the original socket, the reply does not actually pass through the WWW server 300 but is passed directly from the CGI program 310 to the WWW browser.

When the user requests that the bridge perform an action on the teleconference (e.g., end the conference, dial a number, disconnect a participant), the URL information is sent from the CGI program 310 to the PSM Gateway 320 and the PSM Gateway 320 sends a command to a switch controller 350 that controls the bridge 200. In a first embodiment of the present invention, the switch controller 350 in FIG. 9 is implemented on a separate SPARC computer and executes the Programmable Switch Matrix connected to the PSM Gateway 320. The PSM and the switch controller 350 communicate across the communication medium 205 as if the bridge 200 were another computer on a network. However, the bridge 200 can also be connected by a serial line hung off of the computer running the switch controller 350 or any other of the communication adapters described above. In a second embodiment of the present invention, the processes 300, 310 and 350 are run on a single computer 100, and there is no need for PSM Gateway 320 because all communication goes directly to the PSM. In a third embodiment of the present invention, the PSM is run on a second computer or integrated into the bridge 200. In both embodiments, the bridge 200 receives commands (including status requests) based on a bridge-specific command protocol.

One example of a communications message which is part of a communications protocol is listed below in Table I. Table I shows the appropriate byte sequence for commanding the bridge to perform a requested action, and Table II shows the actual byte values of the command sequence. For commands with replies, Table III shows the byte values of a reply from the bridge 200. The structure of these replies have been taken from the LNX 2000 User's Manual, Excel Part Number 08-2003-02, incorporated herein by reference. The values of the replies are stored in the storage device 320 (e.g., hard disk, flash memory, RAM).

TABLE I

Format of Byte Sequence

| Field | Byte | Description |
| --- | --- | --- |
| Frame Indicator | 0 | Always 0 × FE |
| Length (NN) | 1 | Length of bytes to follow, not including the checksum |
| API Message Type | 2 | Function type |
| Sequence Number | 3 | To differentiate messages of the same type |
| Data[0] | 4 | Data content of Message Type |
| Data[ ... ] | ... | Data content of Message Type |
| Data[n] | NN + 1 | Data content of Message Type |
| Checksum | NN + 2 | Checksum |

TABLE II

Command Byte Values Sent to Switch

| | |
| --- | --- |
| 0 × FE | Frame Indicator |
| 0 × 05 | Message Length |
| 0 × 4B | Create Conference |
| 0 × 01 | Seq. Number |
| 0 × 06 | Conference Size (=6) |
| 0 × 01 | Conference Type (1 = u-Law, 2 = A-Law, 3 = mixed) |
| 0 × 00 | Broadcast (0 = disabled, 1 = enabled) |
| 0 × NN | Checksum |

TABLE III

Response Byte Values From Switch

| | |
| --- | --- |
| 0 × FE | Frame Indicator |
| 0 × 05 | Message Length |
| 0 × 4B | Create Conference |
| 0 × 01 | Seq. Number |
| 0 × 10 | Status (0 × 10 = ACK, anything else is error condition) |
| 0 × 00 | Conference ID (MSB) |
| 0 × 01 | Conference ID (LSB) |
| 0 × NN | Checksum |

Throughout the processing of teleconferences, the PSM Gateway 320 has potentially managed more than one teleconference simultaneously. In order to distinguish between teleconferences, the PSM Gateway 320 issues a "cookie" or WWW browser identifier to each WWW browser when each user initiates a conference. To avoid forgeries, this cookie is based the date and time of the initiation, as well as the process ID of the CGI process that sent the initiation document. Together these parameters create a "unique" ID that is difficult to guess randomly. After the PSM Gateway 320 has sent this cookie to the WWW browser via the CGI program 310, the WWW browser stores the cookie internally and transmits the cookie back to the WWW server 300 with each new command or status request. In this way, the PSM Gateway 320 can maintain a table in the storage device 330 that maps control data structures to cookies thereby enabling the PSM Gateway to perform status updates to the storage device 330 on a per-teleconference basis. The cookie also enables the CGI program 310 to distinguish between a status request from a first browser and a status request from a second browser.

The cookie also allows separate billing records to be maintained and checked by conference monitor 300. Conference monitor 340 "wakes up" periodically and checks the status of each line controlled by the bridge 200. For each active leg, the conference monitor 340 determines the cost incurred by the leg and a total cost for the corresponding teleconference. From this, the conference monitor 340 calculates whether or not a teleconference will soon exceed its pre-authorized limit. If so, the computer monitor 340 controls costs according to one of the four embodiments described above.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A computer program product, comprising:
 a computer storage medium and a computer program code mechanism embedded in the computer storage medium for causing a computer to control a telephone bridge linked to the computer, the computer controlling the telephone bridge based on commands from a graphical user interface of a non-operator, the computer program code mechanism comprising:
  first computer code configured to receive a message from the graphical user interface of the non-operator;
  second computer code configured to convert the message into a bridge command specific to the telephone bridge;
  third computer code configured to send the bridge command to the telephone bridge;
  fourth computer code configured to receive a response from the telephone bridge; and
  fifth computer code configured to send the response to the graphical user interface of the non-operator;
 wherein the fifth computer code comprises sixth computer code configured to transmit a cost per minute of a multiparty teleconference before the multiparty teleconference is established.

2. The computer program product as claimed in claim 1, wherein the first computer code comprises seventh computer code configured to receive a user-command as the message.

3. The computer program product as claimed in claim 2, wherein the second computer code comprises eighth computer code configured to establish a multiparty teleconference between plural teleconferees based on the message and without a reservation made in advance.

4. The computer program product as claimed in claim 1, wherein the eighth computer code comprises ninth computer code configured to establish the multiparty teleconference using a connection message per teleconferees.

5. The computer program product as claimed in claim 2, wherein the eighth computer code further comprises tenth computer code configured to disconnect all of the plural teleconferees from the multiparty teleconference based on a single disconnect message.

6. The computer program product as claimed in claim 5, wherein the first computer code comprises seventh computer code configured to receive a status request the message.

7. The computer program product as claimed in claim 3, wherein the fifth computer code comprises eighth computer code configured to transmit at least one of an icon and an icon identifier as part of the response to the status request such that at least one of the icon and an icon identified by the icon identifier is displayed by the graphical user interface as a status of a corresponding connection to one of the plural teleconferees.

8. The computer program product as claimed in claim 3, wherein the first computer code comprises seventh computer code configured to receive a secure HTML request as the message.

9. An apparatus for controlling a telephone bridge based on commands from a graphical user interface of a non-operator, the apparatus comprising:
 a first receiver for receiving a message from the graphical user interface of the non-operator;
 a converter for converting the message into the bridge command specific to the telephone bridge;
 a first transmitter for transmitting the bridge command to the telephone bridge;
 a second receiver for receiving a response from the telephone bridge; and
 a second transmitter for transmitting the response to the graphical user interface of the non-operator;
 wherein the second transmitter comprises a cost transmitting unit configured to transmit a cost per minute of a multiparty teleconference before the multiparty teleconference is established.

10. The apparatus as claimed in claim 9, wherein the first receiver is a receiver configured to receive a user-command as the message.

11. The apparatus as claimed in claim 10, wherein the converter comprises a teleconference establishing unit configured to establish a multiparty teleconference between plural teleconferees without a reservation made in advance.

12. The apparatus as claimed in claim 10, wherein the teleconference establishing unit comprises a connecting unit configured to establish the multiparty teleconference using a connection message per teleconferee.

13. The apparatus as claimed in claim 12, wherein the teleconference establishing unit further comprises a disconnecting unit configured to disconnect all of the plural teleconferees from the multiparty teleconference based on a single disconnect message.

14. The apparatus as claimed in claim 9, wherein the first receiver is a receiver configured to receive a status request as the message.

15. The apparatus as claimed in claim 14, wherein the second transmitter comprises an icon transmitter configured to transmit at least one of an icon and an icon identifier as part of the response to the status request such that at least one of the icon and an icon identified by the icon identifier is displayed by the graphical user interface as a status of a corresponding connection to one of the plural teleconferees.

16. The apparatus as claimed in claim 9, wherein the first receiver is a receiver configured to receive a secure HTML request as the message.

17. A computer-implemented method for causing a computer to control a telephone bridge linked to the computer, the computer controlling the telephone bridge based on commands from a graphical user interface of a non-operator, the method comprising the steps of:

receiving a message from the graphical user interface of the non-operator;

converting the message into a bridge command specific to the telephone bridge;

transmitting the bridge command to the telephone bridge;

receiving a response from the telephone bridge; and transmitting the response to the graphical user interface of the non-operator;

wherein the step of transmitting comprises transmitting a cost per minute of a multiparty teleconference before the multiparty teleconference is established.

18. The method as claimed in claim 17, wherein the first step of receiving a message comprises receiving a user-command as the message.

19. The method as claimed in claim 18, wherein the converting step comprises establishing a multiparty teleconference between plural teleconferees based on the message and without a reservation made in advance.

20. The method as claimed in claim 19, wherein the establishing step comprises establishing the multiparty teleconference using a connection message per teleconferee.

21. The method as claimed in claim 19, further comprising the step of disconnecting all plural teleconferees from the multiparty teleconference based on a single disconnect message.

22. The method as claimed in claim 19, wherein the first step of receiving a message comprises receiving a status request as the message.

23. The method as claimed in claim 20, wherein the step of transmitting the response comprises transmitting at least one of an icon and an icon identifier as part of the response to the status request such that at least one of the icon and an icon identified by the icon identifier is displayed by the graphical user interface as a status of a corresponding connection to one of the plural teleconferees.

24. The method as claimed in claim 23, wherein the first step of receiving comprises receiving a secure HTML request as the message.

* * * * *